Sept. 30, 1930.  E. L. KELLAN  1,777,001

VALVE

Filed July 8, 1927

Inventor:
Edward L. Kellan
By Wm. F. Freudenreich,
Atty.

Patented Sept. 30, 1930

1,777,001

UNITED STATES PATENT OFFICE

EDWARD L. KELLAN, OF CHICAGO, ILLINOIS

VALVE

Application filed July 8, 1927. Serial No. 204,191.

The present invention relates particularly to valve devices having a disc valve that is held closed by the pressure of a spring and is opened by an actuator normally out of operative relation to the valve when the latter is closed; and it has for its object to simplify and improve the construction of such valve devices.

Figure 1:
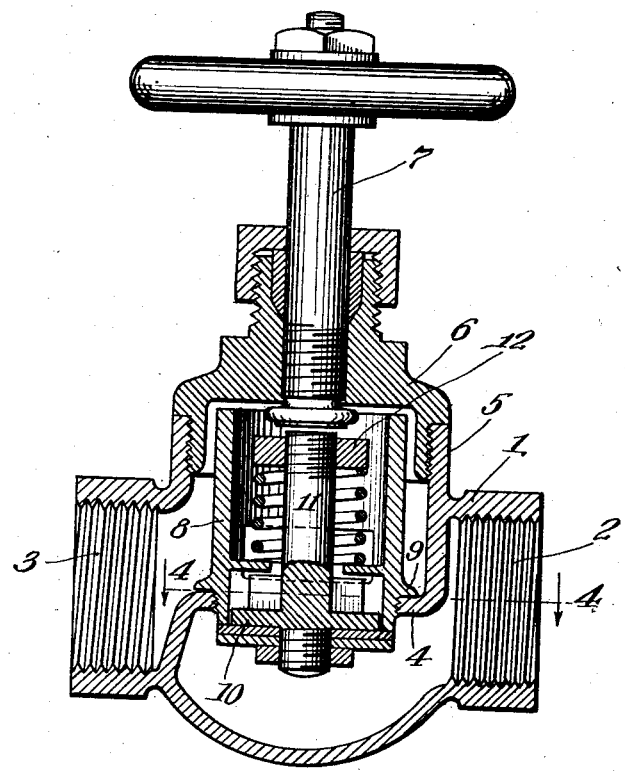
Figure 2:
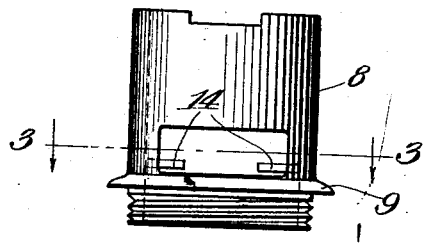
Figure 4:
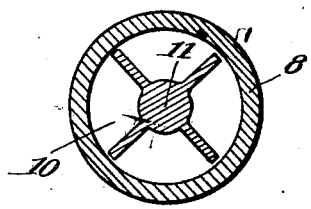
Figure 3:
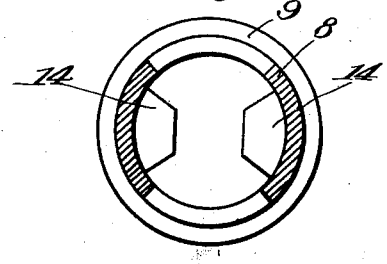

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a central section through a globe valve embodying my invention; Fig. 2 is a side view of the removable shell having thereon the valve seat and carrying the valve; Fig. 3 is a section taken on line 3—3 of Fig. 2; and Fig. 4 is a section taken on line 4—4 of Fig. 1; the body of the globe valve being omitted. It will of course be understood that my invention is not confined to globe valves; but, for the sake of brevity, I shall confine the detailed description to the particular embodiment illustrated.

Referring to the drawing, 1 represents the hollow body of a valve device shown as having an inlet 2 and an outlet 3. Within the member 1 is a diaphragm or partition 4 arranged between the inlet and the outlet. The diaphragm is provided with a large opening which, when uncovered, establishes communication between the inlet and the outlet. On the side of body of the valve opposite the opening in the diaphragm is a tubular projection 5 into which is screwed or otherwise detachably fastened any suitable head structure 6 through which passes a valve actuating stem 7. Within the valve body, and supported by the diaphragm is a sleeve 8 coaxial with the actuating stem 7. I prefer detachably to secure the sleeve to the diaphragm so that it may be bodily removed. This is conveniently accomplished by screwing one end of the sleeve into the opening in the diaphragm and providing the sleeve with a bead or flange 9 that rests on the diaphragm when the sleeve is screwed in. The sleeve projects somewhat beyond the underside of the diaphragm, this end of the sleeve constituting the valve seat. A disc valve 10 underlies the valve seat, being carried on the lower end of a valve stem 11. On the upper end of the stem 11 is a nut 12. Surrounding the valve stem, beneath the nut, is a spring 13 that rests at its lower end upon lugs 14 on the inner side of the sleeve. When the valve is seated against the sleeve and the valve actuating stem is in its raised position, the two stems are out of engagement with each other, so that the valve is held closed solely by the spring and fluid pressure. The amount of pressure on the valve when it is closed may be regulated by adjusting the nut on the valve stem.

The head or cap 6, with the actuating member for the valve may be removed without disturbing the valve proper. Furthermore, the closure of the opening in the diaphragm does not depend upon the presence of the head or cap 6 and the latter may therefore be unscrewed to permit inspection of the valve while the inlet side of the valve is under pressure. In the event that the valve proper needs replacement or the valve seat needs to be ground, the shell or sleeve 8 is simply unscrewed, after the closure 6 has been removed, the valve and its stem leaving the valve body along with the shell or sleeve.

It will be seen that the valve stem is free to swing or move laterally, as it is not held confined; consequently the valve will always adjust itself to the seat with which it cooperates. Furthermore, since the shell or sleeve is screwed into the diaphragm, the expansion or contraction of the sleeve in the lengthwise direction does not affect the closure of the opening through the diaphragm. If this shell or sleeve were fastened to the head element and were simply held by the latter against the diaphragm, the alternate heating and cooling of the sleeve or shell, particularly if the valve device were being used as a steam valve, would cause the sleeve or shell to draw away from the diaphragm and produce a leak. Also, if the sleeve were in contact with the head element, the expansion and contraction of the sleeve when the valve is used for controlling steam, will produce stresses eventually resulting in a loosening of joints; this objection being avoided by allowing the upper end of the sleeve to stand away from the overlying portion of the head element. The valve itself remains unaffected by temperature changes, because it may be said to be a floating element that is always held closed by its spring and fluid pressure when the valve actuator is retracted.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A device of the character described, comprising a body member containing a diaphragm having an opening therethrough, a sleeve overlying and fastened to the diaphragm in registration with said opening, an upwardly-seating valve cooperating with the sleeve to form a closure for the aforesaid opening, a stem fixed to the valve and lying within the sleeve, a part on the upper end of the stem adjustable lengthwise of the latter, an internal shoulder on the sleeve, and a spring between said adjustable part and said shoulder, and an actuator for the stem movable from a position in which it is out of contact with the stem to a position in which it presses the stem down and opens the valve.

2. A device of the character described, comprising a body member containing a diaphragm having an opening therethrough, a sleeve overlying and detachably secured to said diaphragm in registration with the aforesaid opening, an upwardly-seating valve cooperating with the sleeve to form a closure for the aforesaid opening, a spring between the valve and the sleeve tending constantly to hold the valve closed, said body member having opposite the free end of the sleeve an opening large enough to permit the passage of the sleeve, a detachable closure for the latter opening standing clear of the sleeve, and a valve actuator in said closure movable between a position in which it leaves the valve free from its influence and a position in which it holds the valve open.

In testimony whereof, I sign this specification.

EDWARD L. KELLAN.